(No Model.)  5 Sheets—Sheet 1.
P. M. BEERS.
MACHINE FOR SWAGING NEEDLES.

No. 568,472. Patented Sept. 29, 1896.

WITNESSES
H. H. Lawly
S. V. Richardson.

INVENTOR
Philo M. Beers
By H. M. Wooster
Atty.

(No Model.)  
5 Sheets—Sheet 2.

P. M. BEERS.
MACHINE FOR SWAGING NEEDLES.

No. 568,472. Patented Sept. 29, 1896.

WITNESSES  
H. H. Lamb  
S. V. Richardson.

INVENTOR  
Philo M. Beers  
By A. M. Wooster  
Atty.

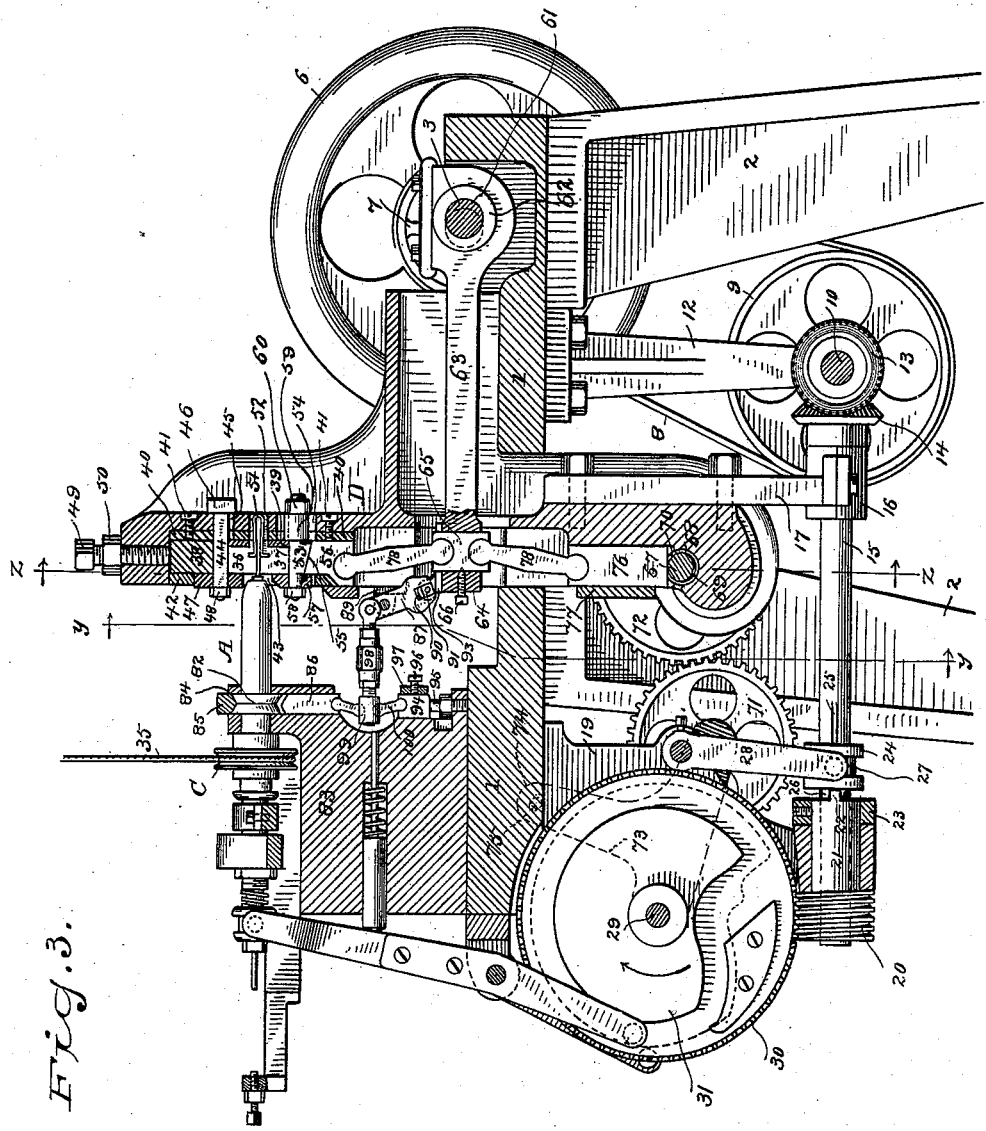

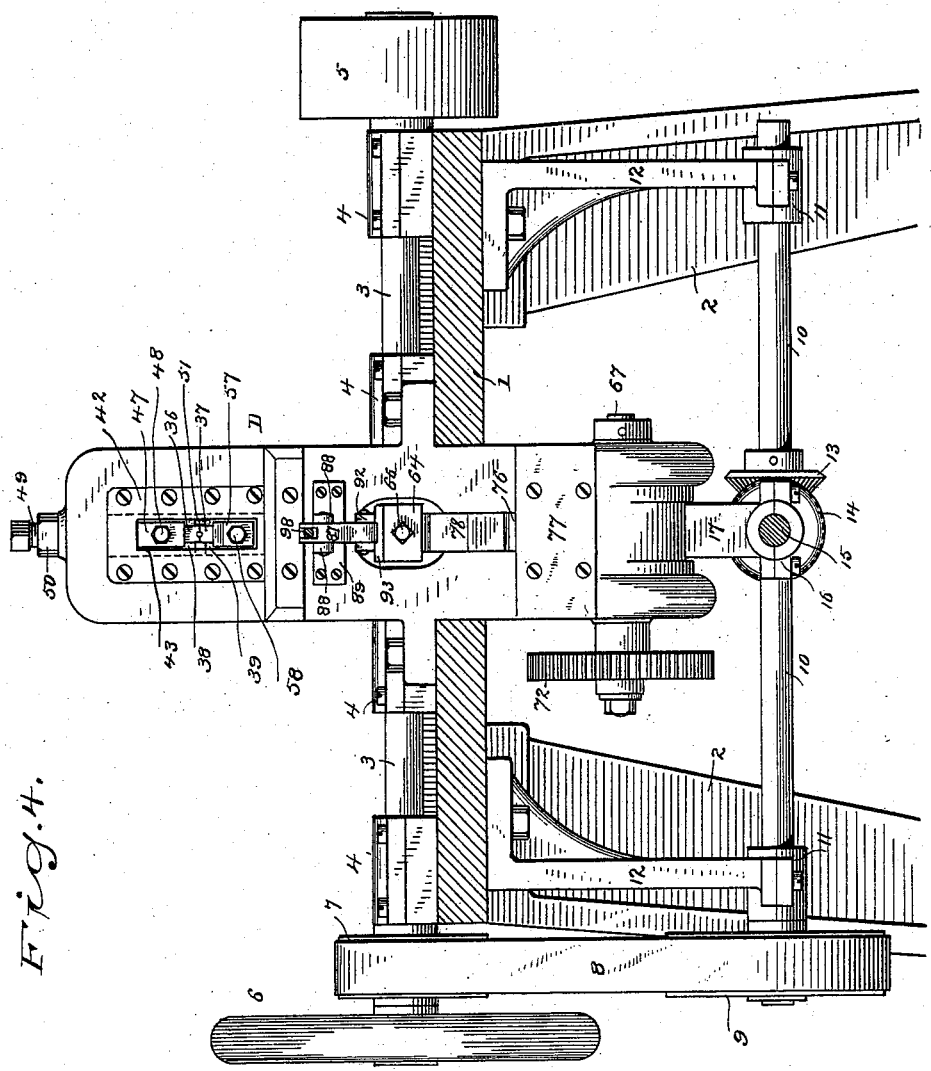

(No Model.) 5 Sheets—Sheet 5.
P. M. BEERS.
MACHINE FOR SWAGING NEEDLES.
No. 568,472. 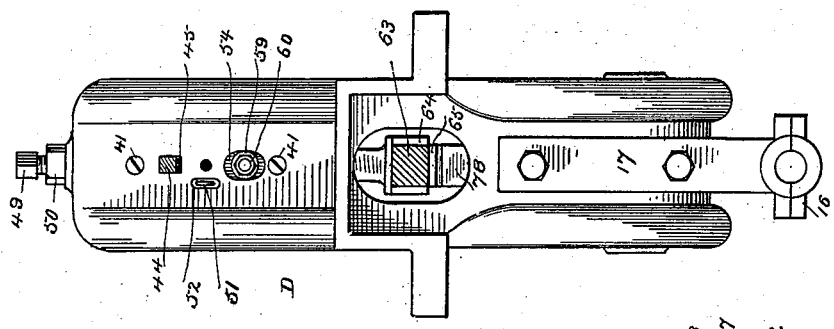 Patented Sept. 29, 1896.
WITNESSES
H. A. Lamb
S. V. Richardson.
INVENTOR
Philo M. Beers
By A. M. Wooster
Atty.

UNITED STATES PATENT OFFICE.

PHILO M. BEERS, OF BRIDGEPORT, CONNECTICUT.

MACHINE FOR SWAGING NEEDLES.

SPECIFICATION forming part of Letters Patent No. 568,472, dated September 29, 1896.

Application filed December 21, 1895. Serial No. 572,879. (No model.)

*To all whom it may concern:*

Be it known that I, PHILO M. BEERS, a citizen of the United States, residing at Bridgeport, in the county of Fairfield and State of Connecticut, have invented certain new and useful Improvements in Machines for Swaging Needles; and I do hereby declare the following to be a full, clear, and exact description of the invention, such as will enable others skilled in the art to which it appertains to make and use the same.

My invention relates to needle-swaging machines adapted to swage either ordinary or cut-back needles, that is, needles in which the diameter is reduced back of the eyes, and has for its object to generally improve the construction and operation of this class of machines.

With this end in view I have devised the novel improvements which I will first describe, and will then specifically point out in the claims.

Figure 1:
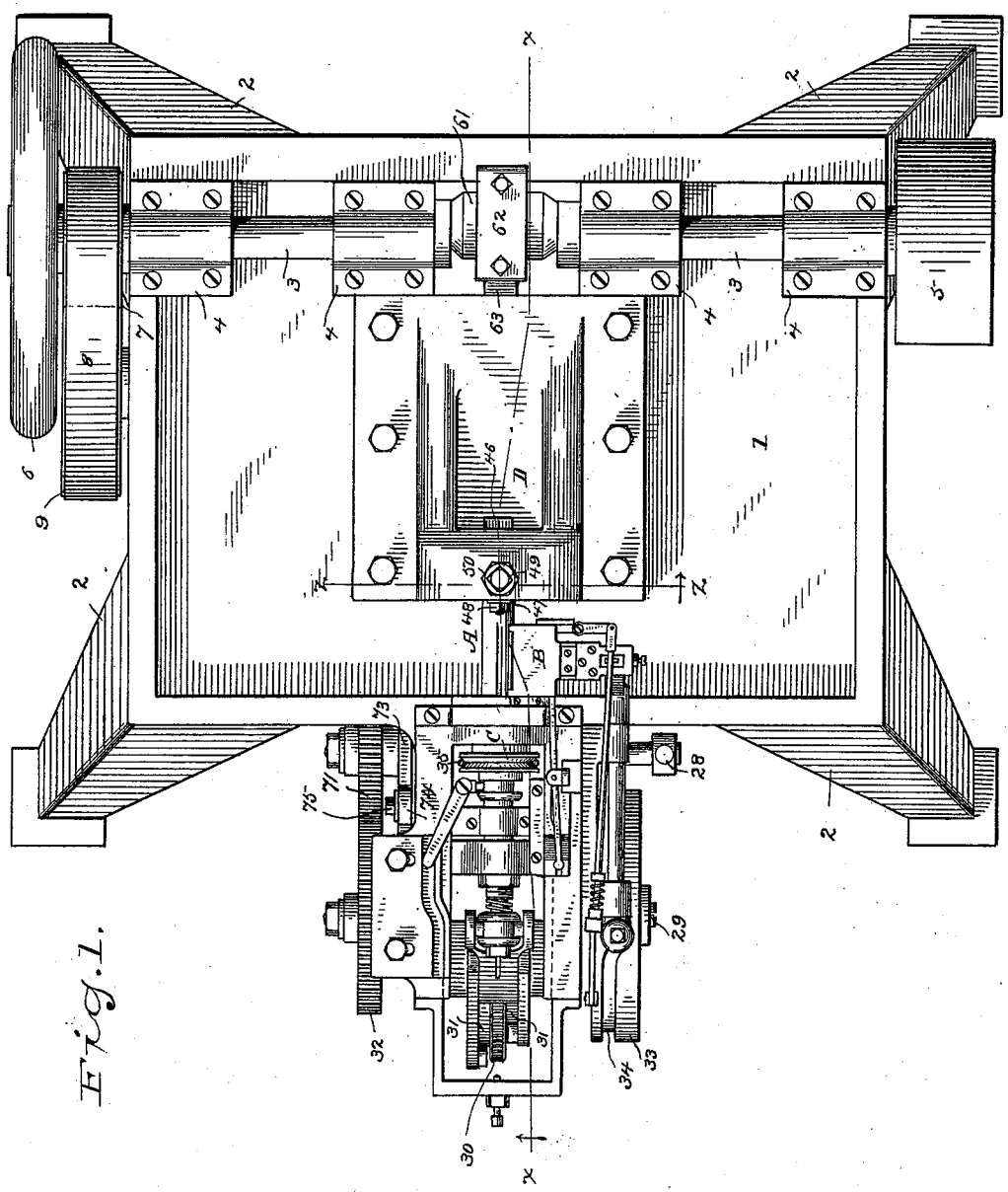
Figure 2:
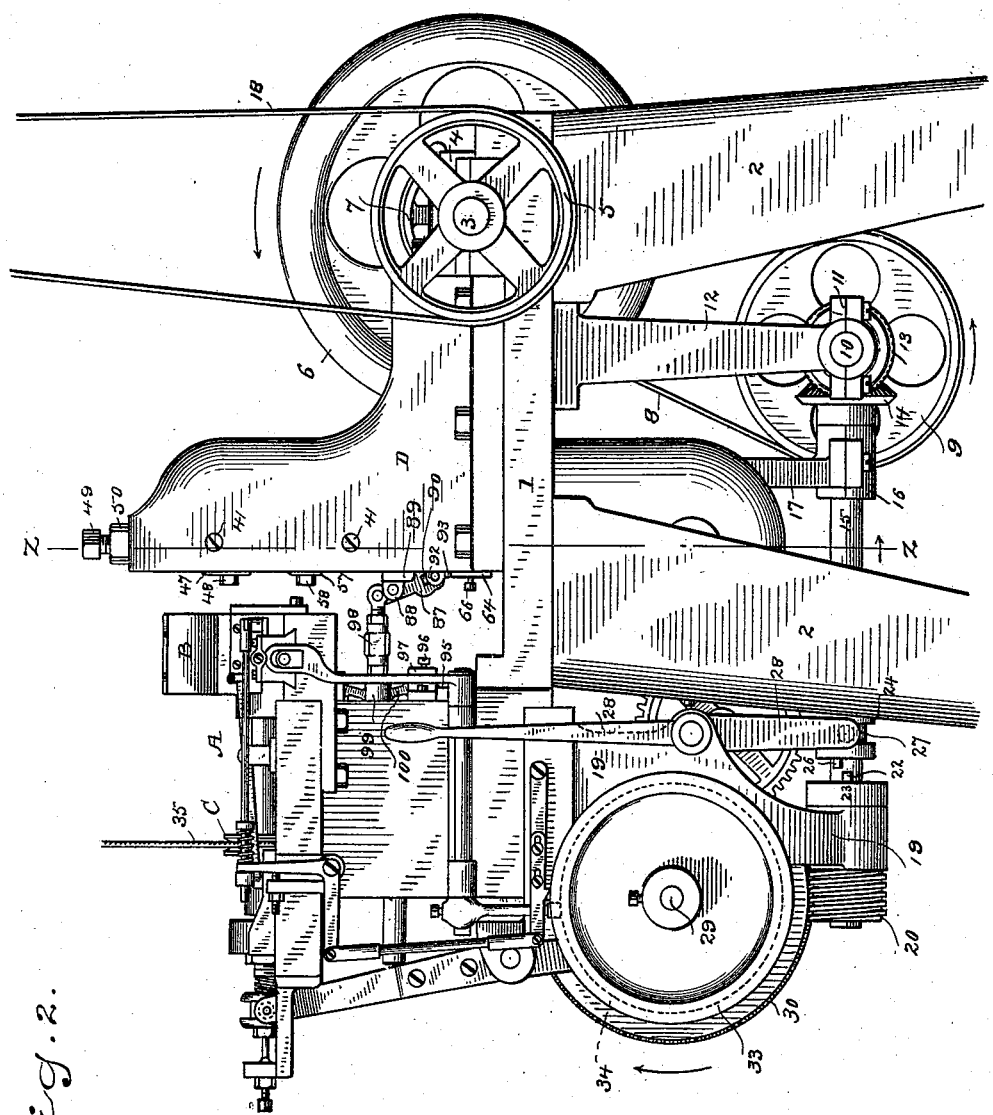

In the accompanying drawings, forming part of this specification, Figure 1 is a plan view of the machine complete; Fig. 2, a side elevation; Fig. 3, a longitudinal section on the line $x\,x$ in Fig. 1; Fig. 4, a section on the line $y\,y$ in Fig. 3, looking toward the right; Fig. 5, a section of the swaging-head on the line $z\,z$ in Figs. 1, 2, and 3; Fig. 6, a rear elevation of the swaging-head, the eccentric-rod being in section; Fig. 7, a detail sectional view of the needle-chuck-driving pulley on the line $w\,w$ in Fig. 8; Fig. 8, a section of the needle-chuck-driving pulley on the line $s\,s$ in Fig. 7. Figs. 9 and 10 are sections on an enlarged scale on the line $x\,x$ in Fig. 1 of two forms of rotating backing-shaft for the movable die, and Figs. 11 and 12 are respectively views of needles swaged by the use of the backing-shafts illustrated in Figs. 9 and 10.

1 denotes the bed of the machine, 2 legs by which it is supported, and 3 the main shaft journaled in suitable boxes 4 upon the bed.

Power is applied to drive the machine in any suitable manner, as by a belt 18, passing over a pulley 5 on the main shaft.

6 denotes a fly-wheel on the main shaft, and 7 another belt-pulley, from which a belt 8 passes over a pulley 9 on a shaft 10, journaled in boxes 11, carried by brackets 12 under the bed.

13 denotes a bevel-gear on shaft 10, which meshes with a bevel-gear 14 on a shaft 15, lying under the bed at right angles to shaft 10 and journaled in a box 16, carried by a bracket 17, and in a sleeve 21, carried by a bracket 19. This sleeve 21 is independent of the shaft which may turn within it, and carries at its outer end a worm 20 and at its inner end a clutch member 22. A collar 23 on sleeve 21 holds the sleeve and worm against endwise movement.

24 denotes a sleeve, which is adapted to slide on shaft 15, but is locked thereto so as to rotate with said shaft by means of a key engaging a groove 25 in the shaft. This sleeve 24 carries a clutch member 26, which is adapted to engage the clutch member on sleeve 21 and is provided with a circumferential groove 27, which is engaged by a roller or rollers on an operating-lever 28, pivoted on bracket 19.

29 denotes a shaft journaled in bracket 19 and lying parallel to main shaft 3. This bracket 19, as seen from the right in Figs. 2 and 3, is substantially U-shaped. It is in fact a double bracket, shaft 29 being journaled in both arms thereof. One arm of said bracket appears in Fig. 3 and the other in Fig. 2. This bracket is not illustrated in elevation, as specifically it forms no portion of my present invention, it being simply necessary that shaft 19 be suitably journaled.

At the center of shaft 29 and lying between the arms of bracket 19 is a worm-wheel 30, meshing with worm 20, by which motion is communicated to the shaft. On the opposite sides of this gear are face-cams 31, by which the mechanism for imparting the forward and backward movements to the needle-chuck is actuated.

At the end of shaft 29, toward the top of the sheet, as seen in Fig. 1, is a gear-wheel 32, from which the mechanism which determines the swaging action of the movable die is driven, and at the opposite end of said shaft is a disk 33, having a peripherical cam-groove 34, from which the needle-feeding mechanism is actuated.

A denotes the needle-chuck as a whole, and

B the hopper in which the needle-blanks to be operated upon are placed, said parts being carried by a casting 83, which rests upon the bed.

As the construction and operation of the needle-chuck as a whole and of the needle-feeding mechanism is practically identical with the mechanism illustrated and described in my former patent, No. 353,529, dated November 30, 1886, and as the special construction of the needle-chuck and of the needle-feeding mechanism is not of the essence of my invention it is not thought necessary to describe said mechanisms in detail, but reference may be made to my said former patent.

Rotary movement is imparted to the needle-chuck wholly independently of the longitudinal reciprocatory movements by means of a belt 35, passing from any suitable shaft or counter-shaft, (not shown,) over a yielding belt-pulley C upon the chuck. The construction of this belt-pulley is one of the novel features of my present invention and will presently be described in detail.

The needle-blanks to be operated upon, that is, to be reduced by swaging to the required form, as, for example, the forms illustrated in either Figs. 11 or 12, are placed in the hopper in the usual manner, and by means of mechanism fully described in my said former patent referred to the blanks are fed singly into position to be grasped by the chuck, which then moves forward, takes a blank from the feeding mechanism, and then moves forward again and places the blank in position to be acted upon by the swaging-dies. As soon as the swaging operation is completed the chuck moves backward, withdrawing the swaged blank from between the dies. The swaged blank is then expelled from the chuck, after which the chuck moves forward, as before, takes another blank from the feeding mechanism, and then moves forward again and places it in position to be acted upon by the dies.

36 represents the stationary die, in the present instance an upper die, and 37 the movable die, in the present instance a lower die. By the term "stationary" I mean that die 36 is stationary in use, although readily adjustable, as will presently be fully explained. These dies lie, respectively, in die-carriers 38 and 39, which slide in a trough-shaped holder 40, itself socketed in a casting D, which I term the "swaging-head," and which is rigidly bolted to the bed. The die-carriers, and with them the dies, are held at the open position, that is, moved away from each other, by means of a spring 51, in the present instance a U-shaped spring, lying in a recess 52 in the swaging-head, and the die-holder. (See Figs. 3, 5, and 6.) The holder is retained in position by screws 41. (See Figs. 2, 5, and 6.)

42 is a removable face-plate covering the socket in the swaging-head, which receives the holder, die-carriers, and dies, said plate being provided with a slot 43. (See Fig. 4.)

44 denotes a backing-piece for the stationary die, which in the present instance is a cross-piece and which passes through a slot 45 in the swaging-head and the holder and also through the die-carrier. (See Fig. 6 in connection with Fig. 3.) Upon one end of this backing-piece, in the present instance the rear end, is a head 46, which is adapted to slide upon the back of the swaging-head for adjustment, and at the other end is a plate 47, which lies in slot 43 in the face-plate and is held in position by a nut 48. The stationary die rests against this backing-piece, as clearly shown in Fig. 5. At the top of the swaging-head is an adjusting-screw 49, which is locked in position after adjustment by a check-nut 50. To adjust the stationary die, therefore, the operator would loosen nut 48 and check-nut 50, after which, if it was required to raise the stationary die, adjusting-screw 49 would be turned outward, and if required to lower said die the adjusting-screw would be turned inward, which would force die-carrier 38, and with it the stationary die, downward, it being of course understood that spring 51 will at all times act to hold the dies or die-carriers, as may be, against their respective backing-pieces. Having determined the adjustment of the stationary die, the operator locks the adjusting-screw by means of the check-nut and locks the backing-piece by tightening nut 48 down upon plate 47.

53 denotes a backing-piece for the movable die. This backing-piece is likewise a cross-piece and passes through a slot 54 in the swaging-head and the holder and under the movable die and die-carrier 39, (see Figs. 3, 5, and 6,) both die-carrier and die in this instance resting upon the backing-piece. Upon the under side of this backing-piece is an incline 55, which bears against a corresponding incline on a block 56, which is adapted to slide in the holder.

It will of course be apparent without detailed description, which, however, will presently be given, that the movable die, its carrier, backing-piece 53, and block 56 all move together in the holder in delivering each blow of the movable die in the swaging operation. The movable die may be adjusted relatively to block 56 by moving backing-piece 53 toward the front or back, as may be required. If the movable die is to be raised, the backing-piece is moved toward the front, thereby raising die-carrier 39 and the movable die by means of the engagement of incline 55 with the corresponding incline on block 56. Should it be required to lower the movable die, backing-piece 53 is moved backward in the swaging-head. Backing-piece 53 may be locked in position after adjustment in any suitable manner. In the present instance I have shown the forward end of the backing-piece as passing through a plate 57, lying in slot 43 and bearing against the movable die and block 56, to which it is locked by a nut 58, and the other end of said backing-piece as passing through a block 59, which lies in slot 54 and bears against die-carrier 39, to which it is locked by a nut 60. In adjusting the movable die nut 58 or 60, as may be, is loosened, and backing-piece 53 is moved in either direction, as required, and then locked in position by tightening up both nuts.

I will now describe the actuating mechanism for the movable die, and in connection therewith the mechanism which determines the shape to which the blank is swaged.

61 denotes an eccentric on the main shaft, 62 the eccentric-strap, and 63 an eccentric-rod integral therewith or rigidly secured thereto and having at its forward end a head 64, in which is a block 65, suitably locked in position, as by a set-screw 66.

67 denotes a shaft which I term the "backing-shaft," this shaft being, as a matter of fact, the ultimate backing of the movable die, as will presently be fully explained. This shaft is journaled in a sleeve 68 in the lower end of the swaging-head, (see Fig. 5,) and the operative portion of said shaft is provided with a cut-away or reduced portion 69 and with a full or cam portion 70. (See Figs. 9 and 10 in connection with Fig. 5.) Rotary motion is communicated to this shaft from gear-wheel 32 on shaft 29 by means of an idler-gear 71, which meshes with a gear 72 on the backing-shaft. In order to provide a convenient adjustment, I have shown idler-gear 71 as carried by an angle-piece 73, which is pivoted on shaft 29 and is provided with an arm 74, having a slot through which a bolt 75 passes. (See Fig. 1 in connection with Fig. 3.) By loosening the bolt slightly the angle-piece may be moved to adjust the idler-gear, then locked in position by tightening up the bolt which clamps the arm against the side of the bed.

76 denotes a block which is socketed loosely in the lower end of the swaging-head and which rests upon the operative portion of backing-shaft 70. The block is held in place by a face-plate 77. (See Figs. 3 and 4.)

78 78 denote toggle-arms, the inner ends of which are socketed in block 65 and the outer ends of which are socketed, respectively, in blocks 56 and 76. The operation of this mechanism will be clearly understood from Fig. 3. It will be seen that during each rotation of shaft 3 block 65 will be thrown forward, and that the thrust of one of the toggle-arms will be taken up by the backing-shaft and the thrust of the other toggle-arm will be communicated to the movable die, so that the entire force of the blow will be delivered to the needle-blank between the dies.

It will of course be understood that my novel machine is perfectly adapted to the swaging of all ordinary classes of needles. The special use of backing-shaft 67, however, is in connection with the swaging of what are known as "cut-back" needles, that is, a class of needles in which the diameter is reduced back of the eye, this class of needles being largely used in the manufacture of corsets and in other classes of work where machines are run at a high rate of speed. In swaging ordinary needles, that is, needles of a uniform diameter, for example, the diameter at the places indicated by 79 in Figs. 11 and 12, it would not be necessary that the backing-shaft be rotated. A backing-shaft cut away, as at 69, entirely around might be used, or the cut-away portion at 69 of either of the backing-shafts in Figs. 9 and 10 might be placed in engagement with block 76 and the rotating mechanism disconnected, so that the backing-shaft would remain stationary.

In the machine illustrated and described in my said former patent, No. 535,529, I provided for swaging cut-back needles by means of an oscillating backing-shaft. My present plan, however, is preferable, for the reason that it enables me to change the shape of the cut-back portion by changing backing-shafts, as by the use of a continuously-rotating backing-shaft I am not limited to any special length of cut-back portion of the needle-blank, as is the case where an oscillating backing-shaft is used. For example, by using a backing-shaft substantially as illustrated in Fig. 10 I produce a cut-back portion substantially as indicated at 80 in Fig. 12, and by using a backing-shaft substantially as illustrated in Fig. 9 I produce a cut-back portion substantially as illustrated at 81 in Fig. 11. Another improvement over the machine illustrated in my said former patent referred to, and over all needle-swaging machines heretofore produced, so far as I am aware, is that I provide mechanism for stopping the rotation of the needle-chuck at the instant that each blow of the movable die is delivered during the swaging operation. In other words, the transmission of rotary movement to the needle-chuck is not continuous, as heretofore, but is intermittent.

It will of course be understood that in any machine of this class at the instant the blow of the movable die is delivered upon the blank during the swaging operation the rotation of the blank, and with it, of course, the needle-chuck, as the blank is tightly gripped by the chuck, must be checked. The result is a tendency to twist the blank until the belt which drives the needle-chuck slips, or else breakage of some part must take place. This is wholly obviated in my present machine, and all torsional strain upon the needle-blank at the instant the swaging-blows are delivered is prevented, in the manner which I will now describe.

82 denotes a brake-pulley on the needle-chuck, which lies in a recess 84 in casting 83 and is covered by a cap-plate 85, which is screwed to the casting.

86 denotes a sliding brake-shoe, which is loosely socketed in casting 83 and is adapted to be forced into engagement with the periphery of the brake-pulley, the brake-pulley being shown in the present instance as provided with a grooved periphery, and the operative face of the brake-shoe being, of course, shaped to correspond therewith. The brake-shoe is operated in the manner which I will now describe.

87 denotes a lever pivoted between hubs 88 on a plate 89, which is screwed to the face of the swaging-head. In the lower end of this lever is a recess 90, in which is a sliding block 91, which is pivoted between hubs 92 on a plate 93, which is rigidly secured to head 64 on the eccentric-rod. These details of construction are not of the essence of my invention, as any other form of sliding joint may be used, if preferred.

94 denotes a block which rests upon an adjusting-screw 95 in casting 83 and is locked in position by a set-screw 96 in a plate 97, screwed to the casting and inclosing the block. Should it be required at any time to raise or lower the block, the set-screw is loosened and the block raised or lowered by means of the adjusting-screw.

98 denotes an adjustable connecting-rod, one end of which is pivoted to the upper end of lever 87 and the opposite end of which is provided with a head 99.

100 100 denote toggle-arms, the inner ends of which are socketed in head 99 and the outer ends of which are socketed, respectively, in block 94 and in the brake-shoe.

The operation of the brake-shoe will be readily understood from Fig. 3. When eccentric-rod 63 moves toward the left, as seen in Fig. 3, it will of course throw the movable die into operative position, and by means of the connections just described, lever 87 being pivoted to the swaging-head, it will at the same instant force the brake-shoe against the brake-pulley and will stop the rotation of the needle-chuck. The blows of the movable die are delivered with great rapidity, and the instant a blow is delivered toggle-arms 78 are moved outward again by the eccentric-rod, and the movable die is thrown to its open position by spring 51. The action of the brake-shoe, however, is just as quick as the action of the die. At the instant the blow of the die is delivered the rotation of the needle-chuck is checked. The checking, however, is instantaneous only, as the outward movement of toggle-arms 100 instantly relieves the pressure upon the brake-shoe, which, as it moves freely in its socket, instantly drops away from the brake-pulley. In connection with my novel brake mechanism for the needle-chuck I use a yielding belt-pulley, preferably my novel belt-pulley C, the construction of which is clearly illustrated in Figs. 7 and 8. The pulley proper consists of two side plates 101 and 102, each of which is provided with a hub 103, said hubs turning freely on the outer shell 104 of the needle-chuck. One of said side plates, in the present instance side plate 102, has rigidly formed therewith the periphery or belt-receiving portion of the pulley, which is denoted by 105. Between the side plates is a recess 106.

107 denotes blocks between the side plates, which may be formed integral with one of said side plates, or said side plates and said blocks may be rigidly locked together by screws 108, engaging both side plates and the blocks.

109 denotes a cross-piece lying within the recess in the pulley proper, and which is rigidly secured to the outer shell of the needle-chuck, as by a key 110, said cross-piece being wholly independent of the pulley proper, the cross-piece being rigidly secured to the outer shell of the needle-chuck and the pulley proper turning freely thereon.

111 111 denote springs, the ends of which bear, respectively, against blocks 107 and against the cross-piece.

The operation of my novel pulley is as follows: Power is applied to the pulley proper by means of belt 35, and is transmitted from the blocks which are part of the pulley proper through the springs to the cross-piece to carry the chuck, the springs being stiff enough in practice so that the chuck will be carried by the pulley. The instant, however, that the rotation of the chuck is stopped by the engagement of the brake-shoe with brake-pulley 82 the springs will yield for an instant, so as not to interfere with the continuous rotation of the pulley proper, but permitting the rotation of the chuck to be stopped by the action of the brake-shoe on pulley 82 at the instant that each blow of the movable die is delivered. The instant the blow is delivered, however, the chuck is released and the recoil of the springs, acting upon the cross-piece, starts the chuck forward again. These operations are repeated many times in a second, as the main shaft is driven at a high speed. It will be seen, however, that while the rotation of the belt-pulley is continuous the rotation of the needle-chuck is intermittent.

The operation of the several mechanisms of my present machine has been described so clearly in describing the machine itself that a description of the operation of the entire machine in detail is not thought to be required.

Having thus described my invention, I claim—

1. In a machine of the character described the combination with a needle-chuck, and stationary and movable dies, of mechanism for stopping the rotation of the needle-chuck at the instant each blow of the movable die is delivered.

2. The combination with a needle-chuck having a brake-pulley 82 and stationary and movable dies, of a brake-shoe adapted to engage said pulley and mechanism for actuating the brake-shoe to stop the rotation of the chuck at the instant each blow of the movable die is delivered.

3. The combination with a needle-chuck having a brake-pulley 82 and a yielding belt-pulley C, and stationary and movable dies, of a brake-shoe adapted to engage said brake-pulley and mechanism for actuating the brake-shoe to stop the rotation of the chuck at the instant each blow of the movable die is delivered.

4. The combination with a needle-chuck having a cross-piece 109 and a brake-pulley 82, of a pulley C journaled on said chuck and having a recess to receive the cross-piece, springs between the cross-piece and the pulley which normally permit the pulley to drive the cross-piece and chuck, a brake-shoe and actuating mechanism therefor which stops and releases the brake-pulley, chuck and cross-piece, the springs yielding at the instant the brake-shoe acts and their recoil starting the parts forward again the instant they are released, so that rotary movement of pulley C is continuous and rotary movement of pulley 82, the cross-piece and chuck is intermittent.

5. The combination with a needle-chuck having a brake-pulley 82, of a brake-shoe 86 and mechanism acting to intermittently stop and release the brake-pulley and chuck.

6. The combination with a needle-chuck having a brake-pulley 82, the stationary die and the movable die, of brake-shoe 86 and mechanism for actuating the lower die to swage a blank and mechanism for actuating the brake-shoe to stop the chuck at the instant each swaging blow is delivered.

7. The combination with a needle-chuck having a brake-pulley 82, a stationary die, a movable die and a brake-shoe adapted to engage the brake-pulley, of eccentric-rod 63 having a head 64, toggle-arms 78 one of which acts upon the movable die, toggle-arms 100 one of which acts upon the brake-shoe, lever 87 one end of which is connected to head 64 and a connecting-rod 98 one end of which is pivoted to lever 87 the other end carrying a head by which toggle-arms 100 are actuated, the parts being so arranged that the toggle-arms will act respectively and simultaneously to produce a swaging blow and to stop the rotation of the chuck.

In testimony whereof I affix my signature in presence of two witnesses.

PHILO M. BEERS.

Witnesses:
A. M. WOOSTER,
S. V. RICHARDSON.